June 3, 1952  E. J. BERRY ET AL  2,598,882
TEMPLE MOUNTING MEANS FOR LOOMS
Filed Oct. 19, 1950  2 SHEETS—SHEET 1
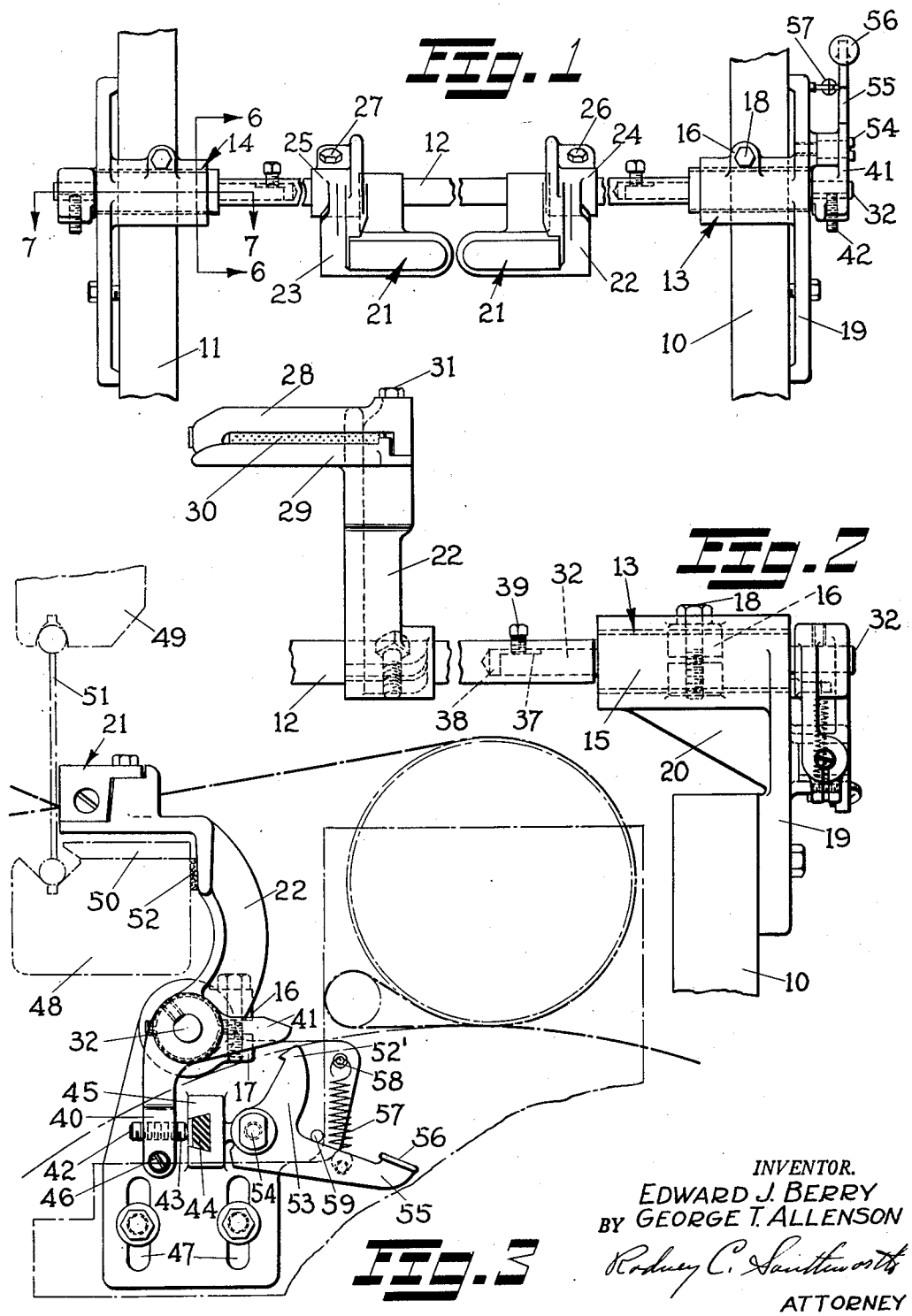
INVENTOR.
EDWARD J. BERRY
BY GEORGE T. ALLENSON
Rodney C. Southworth
ATTORNEY

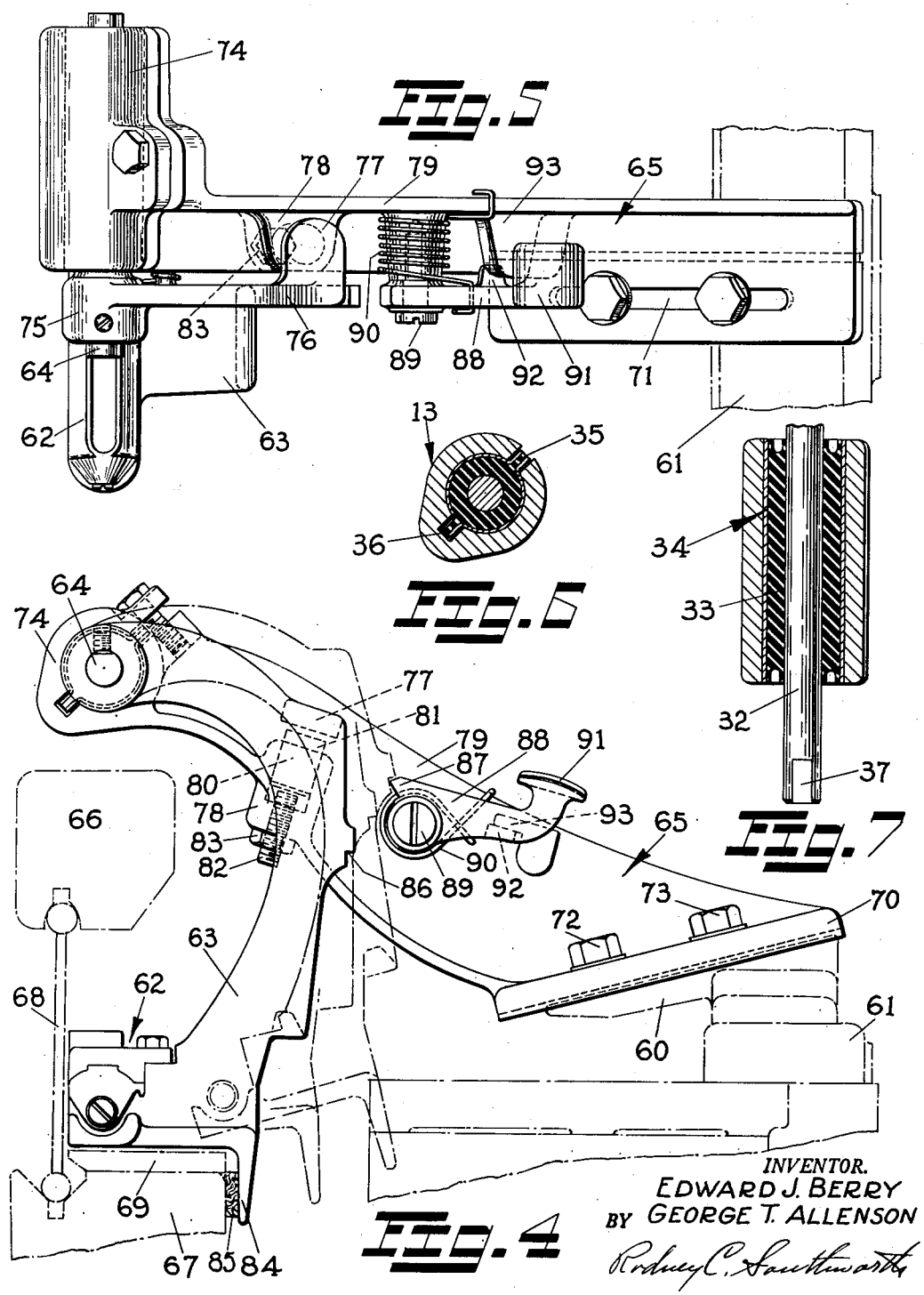

Patented June 3, 1952

2,598,882

UNITED STATES PATENT OFFICE 2,598,882

TEMPLE MOUNTING MEANS FOR LOOMS

Edward J. Berry, Cranston, and George T. Allenson, Lincoln, R. I., assignors to Draper Corporation, Hopedale, Mass., a corporation of Maine Application October 19, 1950, Serial No. 191,039

16 Claims. (Cl. 139—298)

This invention pertains to temples for looms, and more specifically, to improvements in the mounting means upon which said temples are moved and by which they are resiliently biased in one direction.

It is a general object of the invention to improve temple mounting means for looms so that the noise generally associated with these elements is substantially eliminated, so that the wear of the moving parts is entirely eliminated and so that no lubrication whatsoever shall be required.

It is a more specific object of the invention to provide mounting means for movable temples for a loom which shall comprise resilient rubber, or rubber-like, bearings or bushings so devised that these bushings provide a suitable, long-lived bearing means upon which the temples move through limited oscillations and also the biasing force necessary to return the temples to initial angular position from which they were displaced upon each beat-up movement of the reed.

It is a further object of the invention to provide resilient rubber mounting means so attached or bonded to the fixed and moving parts of the temple mounting means as to provide a bearing therefor which shall require no lubrication whatsoever, thereby obviating the difficulties which have always attended these mechanisms where lubrication has been required, but at the same time has been very undesirable since it may spoil or damage the material being woven.

It is a further object of the invention to provide complete rubber insulation of the temple means from the remaining parts of the loom so that there shall be no generation or transmission of noise incidental to movement of the temple mounting parts, and so that whatever noise there may be in the temple parts shall be effectively insulated thereby to suppress or absorb it as much as is practicable.

It is a further more specific object of the invention to provide temple mounting means which shall be located beneath the fabric line on suitable bearings maintained rigidly in position by attachment to the framework or other rigidly positioned parts of the loom, and to so mount the temples on a shaft extending more or less continuously across the entire loom, or at least from a bearing at one side thereof to a bearing very widely spaced therefrom so that the movement of the temple shall be accompanied only by a torsional stressing and distortion of the rubber bushing or bushings employed, thereby keeping the local distortion of these parts at a minimum and assuring that the movement of the temples shall be confined to a single plane.

It is a further object of the invention to provide temple mounting means which shall be virtually indestructible and not at all subject to corrosion, and in which there shall be no relative movement between metallic parts thereby to give rise to abrasion of the parts and attendant possible damage to the fabric by deposit of the abraded material thereon, and which shall also do away with a general wearing of the parts thereby giving rise to misplacement or inaccurate movement of the temples themselves.

It is a further object of the invention to provide a temple mounting means having a rubber-like bushing or bushings, used to support and restrain the motion of the temples to a limited arc of a circle, and to have the centers of the rubber bushings so fixed that the motion of the temples through a limited arc of a circle shall substantially coincide with the line of progress of the cloth from point of weaving to wind-up.

Other objects of the invention will become apparent from the following more detailed disclosure.

Temples are employed on practically all looms for weaving and maintain the fabric relatively taut and at a prescribed width at the point of weaving, these elements being capable of functioning along various principles, although it has become more or less conventional to employ the rotary type in which small rollers covered with rubber or having set therein small pointed, fabric-engaging pins are arranged helically or are otherwise disposed at such angle to the passing fabric that, as the fabric moves through the said temple means, it is stressed widthwise. These temples have either been mounted at the ends of arms adapted to be swung to and fro throughout a relatively small angular extent, or at the ends of supporting members adapted to reciprocate in suitable holder or bearing means, each of these different mountings having been provided with resilient biasing means which always tends to move the temples rearwardly of the loom or contra to the direction in which the fabric is being woven and taken up. The movement of the temples is generally stopped in a rearward direction at some convenient, prescribed point, while the forward movement thereof against the tension of said resilient means is brought about by contact of the lay or certain abutments forming a part thereof which engage against convenient and appropriately formed cooperating surfaces on some part of the temple means itself or the supporting structure therefor.

The movement of the temples as above described has always been provided for by bearings of some metallic type which preferably should have been lubricated, but which must be very carefully lubricated, although in many instances, they are not. A lack of lubrication naturally causes premature wearing of the parts so that these temple mounting devices have always been subject to a great deal of wear necessitating replacement of parts after a shorter period of time than should have been the case, and in some instances, causes an abrasion of surfaces, the abraded material from which has been deposited on the fabric being woven thereby causing stains which have detracted from its value. In the event lubrication is attempted, it should be applied very sparingly, but since there is a human element involved, there has frequently resulted an excess of lubrication, so that the lubricant has been transferred to the material being woven. The stains therefrom may spoil that material, at least for its intended purpose, and, to say the least, frequently detract from the value of certain portions thereof.

The temples, especially on looms operating at relatively high speeds, account for a very great portion of the noise attendant upon operation of the loom and as the temple mechanisms wear, this noise becomes more pronounced, there being very little that can be done about it insofar as the present structures are concerned.

The metallic working parts of the temple mounting means have in some instances become corroded, especially when looms have been lying idle in damp climates for a short period of time, and if relatively fine materials are being woven, the temple means must be cleaned or this corrosion removed in order to avoid the great likelihood that it will become deposited upon the material being produced once the loom is started.

In obviating the above mentioned undesirable characteristics of temple mechanisms as heretofore constructed, and in realizing the objects of the invention above set forth, applicants have devised temple mounting means which is relatively simple, and which definitely positions the temples in a proper plane and limits their motion to confine their oscillation to a very precise pathway, all this being accomplished without resort to lubrication at all, by moving the temple mounting means on bearings which are not subject to wear, and which serve the dual function of a bearing means and also of resiliently biasing the temples against the general movement of the fabric being produced. The temples instead of being slideably mounted within a translating mechanism are adapted to be rocked to and fro or oscillated throughout the proper angular extent upon a shaft or similar pivot means which is itself mounted on one or more resilient rubber bushings as will be described hereinafter in greater detail. These resilient rubber bushings may be set so as to provide the requisite torque to act as a return biasing means for returning the temples and their supporting structure to a position limited by a stop means after each movement thereof incidental to the beat-up function.

The invention takes different forms, two specific ones of which have been illustrated here, but it is to be understood that the swinging temple carrying arms may be separately mounted for independent movement, or may be mounted on a single shaft so that they move in unison, or the said bearing means may be and preferably are to be rather widely spaced at either side of each temple or each pair of temple mounting means as will hereinafter be described in detail, or the temple mounting arm may be carried at one end of a short shaft, the other end of which is suitably supported upon bracket means forming a part of the loom structure, the said resilient rubber bushing being provided either as a part of the arm or of the bracket. In either instance, the temple mounting arms are adapted to be stopped against resilient or other sound insulating stop means such as a rubber buffer. Preferably the temples may be moved to what may be termed an inactive position, that is, one spaced somewhat beyond the normal amplitude of movement of the mechanisms at which point they may be temporarily and releaseably latched, for example, as when it becomes necessary to adjust or otherwise work on either the temples themselves or some other mechanism of the loom at that general locality, or on the cloth itself.

The invention will be described hereinafter in greater detail by reference to certain forms thereof shown in the accompanying figures of drawings wherein:

Fig. 1 is a plan view showing temples and mounting means therefor comprising a shaft extending across the loom, bearings for which are provided at the loomsides in accordance with the invention.

Fig. 2 is an elevational view taken from the front of the loom and showing bearing means for the temple mounting shaft at one side thereof.

Fig. 3 is a view taken from the side of the loom showing the relative position and arrangement of the parts incidental to mounting the temple supporting structure at one end thereof.

Fig. 4 is a view similar to Fig. 3, but showing the temple mounting means as applied to a more conventional fly shuttle loom and being mounted above the fabric line rather than below as is the case with respect to the form of invention shown in the first three figures.

Fig. 5 is a plan view of the mechanism shown in Fig. 4.

Fig. 6 is a transverse section taken through a bearing means on which the temple arm shaft is oscillatable and at line 6—6, Fig. 1.

Fig. 7 is a section taken longitudinally of the said bearing means and at line 7—7, Fig. 1.

Now referring to Figs. 1, 2 and 3, the invention has been illustrated as applied to a loom of the type shown in application Serial No. 71,622, filed January 19, 1949, or that type of loom in which filling is inserted from an external source and therefore, there is a great deal more room available forwardly of the swords and between the lay and breast beam so that bearings may be applied directly to the loomsides and a shaft extended clear across the loom on which may be located the arms at the free ends of which the temples are carried. Here loomsides are indicated at 10 and 11 and a shaft 12 extends directly across the loom having support at each end in a bushing hereinafter to be described in greater detail and which is fixed within a clamping type bearing housing, one of which is shown at 13 and a similar one of which is also applied at the opposite side of the loom at 14. These bearing members or brackets, as better illustrated in Figs. 2 and 3, comprise a hub portion 15 one side of which is split and which has ears 16 and 17 which may be drawn or clamped together by bolt means 18, or in any other convenient manner. These hubs 13 and 14 are carried at one end, herein shown as the upper end, of supporting brackets 19 which bolt or attach in any convenient manner to the loomside. A web 20 extends from a part of the bracket to the hub for strengthening purposes.

The shaft 12 is preferably of sufficient size to provide rigidity and resist deflection or tendency to be distorted torsionally even though it extends across a considerable span as is necessary in wider looms. The temples themselves which are indicated by numerals 21 and which may be formed in accordance with any of the known temple constructions which are successfully employed, are carried at the relatively free ends of arms 22 and 23, these arms being provided with hubs 24 and 25 by which they are adjustably fixed along the length of the shaft 12 as may be necessary for effecting their proper positioning for weaving different widths of fabric. They also may be adjusted angularly of the shaft thereby to preload the elastic rubber torsion members as will hereinafter be described. The hubs 24 are again of split form and have extending portions through which screws or bolts 26 and 27 are passed and by means of which the hubs may be clamped on the shaft 12 once they have been properly positioned.

In accordance with the requirements of the loom to which applied, the temples themselves may be of different designs, but it is preferable that rotary type temples be employed, that is, that type of instrumentality for the purpose which includes at least one roller having a fabric engaging surface designed to extend the fabric widthwise as it is passed through the temple. These temples normally include a pod or casing which comprises a top cover 28 and a lower member 29 within which or between which are rotatably supported one or more temple rolls 30 which may have rubber covered surfaces or which may be studded with a plurality of sharp pins arranged in a particular manner. These casing members are designed to guide the fabric through between the lower casing member 29 and the rollers and each is attached to its arm 22 or 23 by suitable bolts 31, or by any other satisfactory connecting means.

Generally speaking, the elastic rubber bushings which constitute a combined bearing for the shaft 12 and a torsion spring for biasing the temple carrying arms 22 and 23 against the movement of the fabric being woven, comprise an annular mass of rubber of extremely tough and resilient nature and which is preferably compressed or otherwise held between an outer shell and an inner shaft or core. It is also preferably bonded to the interior of the shell and to the core. While it is conceivable that several different types of these elastic rubber bushings may be employed, one which is actually used to advantage is illustrated here in Figs. 6 and 7, sections taken transversely and longitudinally, respectively, through one of said bushings and, while it is conceivable that the rubber bushing may be bonded directly to the shaft 12, it is preferable that these bushings be made up as a quickly replaceable unit comprising the outer shell, a short shaft which extends from the bushing in at least one direction for a suitable distance and the rubber bonded between these elements. This makes it possible to clamp the shell in a desired position, to connect the extending end of the short shaft to the shaft 12 or to another element serving an equivalent purpose and to lock the two against relative movement thereby making it possible to handle the rubber bushings more expeditiously and treat the bearing members as separate, self-contained units which enter into the entire combination without the difficulty of attempting to bond the rubber to one of the larger members such as the shaft 12 which go to make up the temple assembly itself.

These bushings are shown more clearly in the figures to which attention has been called and comprise short shafts or spindles 32 to which the annular rubber bushing 33 has been bonded and a shell member generally indicated by numeral 34 and which may be formed in two parts as herein illustrated or which may, if desired, be of a single part of tubular construction which may be contracted over the bushing 33 in any convenient manner, the bushing preferably being bonded to the interior of this shell as well as to the shaft. Here the rubber has been squeezed out between certain projecting ears of the shell, this being illustrated at the points 35 and 36, Fig. 6, and the external bearing member such as the bearing 13 is so formed as to provide slots within which these extending portions are received thereby to prevent turning of the bushing within the supporting bearing bracket itself. The split construction of the bearing members serves effectively in clamping the shell 34 and thus the entire resilient rubber bushing assembly in place.

Now returning to Figs. 1 and 2, the extending end of the shaft 32 is flattened off as at 37 and is clamped in position within a receiving aperture 38 in the end of shaft 12 by a set screw 39, although it is to be understood that any satisfactory means of interlocking the extending end of the shaft 32 within the shaft 12 and for maintaining concentricity of the two will serve.

The movement of the temples under the biasing influence of the elastic rubber bushings is stopped at some appropriate point which is adjustably maintained by means of depending arms 40 keyed or otherwise fixed as by means of suitable set screws at the outer extending ends of the shaft 32, which are, as herein illustrated in Figs. 1, 2 and 3, adapted to mount the said depending arms and also at one end, a more or less horizontally disposed arm 41 the purpose of which will hereinafter be explained. Each arm 40 carries an adjustable stop screw 42 which contacts against a metallic plate 43 bonded to a rubber or other resilient buffer member 44 retained in a suitable groove or receiving socket in a projecting lug 45 which is preferably formed or cast as a part of each bracket 19. The heads of the screws 42 strike against the cushioned plates 43 and thereby limit the rearward travel of the temples. The adjustment provided makes it a simple matter to regulate the extent of this rearward travel and to bring each of the stop means into properly adjusted relationship so that both make contact at practically the same instant. If desired, the plates 43 may be dispensed with and the heads of the screws 42 may strike directly against the cushioning rubber.

Thus it may be seen that the temples themselves are mounted upon the rubber bushings above described and the contact made between the screws 42 and the rubber stop members 43 prevent any metal to metal contact which may be directly carried through into the remaining framework of the loom and also obviate the generation or transmission of noises which are so pronounced with the more conventional temple mechanisms and their conventional mountings. The screws 42 are locked in adjusted position since the lower end of the arm 40 is split and after adjustment of the screws 42 to a proper position, the split ends of the arms are clamped together by clamping together screws 46 or other locking means.

The entire temple structure may be adjusted vertically and swung to position the shaft 12 as may be desired since the bearing brackets 19 are slotted as at 47 and are clamped to the loomsides 10 and 11 as illustrated in Fig. 3.

As further illustrated in Fig. 3, the lay mechanism includes a lay beam 48, hand rail 49, a raceway 50 for the filling inserting means and a reed 51 mounted to be carried on swords (not shown). The beam is provided with a leather, fibre, or other suitable buffer 52 attached at the forward portion thereof for striking a cooperating surface on each of the arms 22 so as to move the temples, arms 22 and 23 and attached parts throughout a slight angular extent against the biasing tension of the preloaded bushings, the torsional resistance of which may be set at any predetermined convenient value. In practice, the mechanism is assembled and the general construction of the parts is such that the arms 40 depend as illustrated and when adjusted suitably by means of the screws 42, a certain amount of torsion is set up in the resilient rubber bushings, it being generally understood that a torque of approximately fifty inch pounds will serve satisfactorily in most instances. When thus adjusted and after the screws 42 have been locked in position, the arms 22 and 23 with temples 21 may be swung to proper position relatively to the fell of the cloth, since the clamping screws 26 and 27 may be loosened and the arms 22 and 23 swung angularly about the shaft 12 as well as adjusted lengthwise thereof for the purpose above mentioned. When properly positioned, screws 26 and 27 are set up after which the mechanism is properly and rigidly secured in an adjusted relationship wherein it may be expected to function without further attention.

At times it is desirable to move the temples forwardly to a greater extent than that reached during their normal movement, or to move them to what will hereinafter be termed an inactive position. For that purpose, there is provided certain latch means at one side of the loom, this being attached conveniently to a bracket 19, or to any other convenient part of the structure, one such latch being shown at 52', Fig. 3, and being formed at one end of an arm 53 of a lever pivoted at 54 and having a second arm 55 with a suitable thumb piece 56 at its outer end by means of which it may be employed to release the latch. A spring 57 connected at one end to the arm 55 and at its opposite end to a pin or other anchoring means 58 extending from some fixed part of the loom framework serves to urge the latch in a direction so that it will engage the outer end of the arm 41 whenever the temples are moved forwardly throughout a sufficient angular extent. It is to be understood that the torque exerted by the elastic rubber bushings is not so great that there is any particular difficulty in so moving the temples, and upon release by pushing downwardly on the arms 55, they merely spring back to the position occupied before being moved to the said inactive position. It is to be understood that this inactive position is necessary only if the temples are to be moved out of the way, e. g., to expose other parts or the cloth to which access is desired. The arm 55 is shown drawn upwardly by spring 57 until it stops against a pin 59, that position being one in which engagement between the latch 52 and the end of arm 41 may take place.

Now referring to Figs. 4 and 5, a modification of the invention will be described, this modification involving separately or independently mounted temples and also mountings which are superimposed above the fabric rather than being mounted beneath the fabric as was the case with that form of the invention described heretofore. The mounting means may be applied at any convenient one of the upper surfaces of the loom, but as herein illustrated, is fixed to the forward part of the loom framework and more specifically to a pad 60 attached to the breast beam 61, or to any other convenient part of the loom at that relative position. The temples generally indicated by numeral 62 and being of any convenient form adaptable to the particular weaving problems at hand, are connected by suitable bolts or screws to the lower ends of arms 63, one of which is illustrated in these figures, the upper end of said arm being affixed to a short shaft 64 which corresponds to the shaft 32 heretofore mentioned and illustrated in Figs. 6 and 7 and which is preferably bonded to the elastic, rubber annulus of the bushing which may comprise either a part of the moving structure to which the temple itself is attached, or may be clamped in the supporting means therefor, for example, the supporting bracket or arm 65. The arm 63 which depends to mount the temple itself in a position close to the fell of the cloth and just above the upper surfaces of the lay as it moves to its most forward position, is curved as illustrated so as to avoid interference with the hand rail 66 or other parts of the lay at that general vicinity. The lay structure here comprises the usual elements, for example, a lay beam 67, reed 68, raceplate 69 and other parts which may be mounted on suitable swords all in a manner well understood by those conversant with this art.

The mounting brackets 65 are flanged at their forward ends as at 70 and these flanges are slotted as at 71 to attach by means of suitable screws 72 and 73 to the bracket 60 and thereby to provide a certain amount of adjustment forwardly and rearwardly of the loom.

According to the particular mode of construction herein to be described, the elastic rubber bushings are clamped in a hub 74 at the upper and rearmost end of the arm 65, the said bushing more preferably taking the form illustrated in Figs. 6 and 7 and being clamped in a manner according to that description, so that the projecting end of the shaft 64 is received in a hub 75 at the upper end of the arm 63, said shaft end being fixed therein in any convenient manner, for example, by keying or by suitable set screws for clamping the members in a relatively fixed position. In this form of the invention it is not necessary to carry the shaft out of both ends of the bushing.

The arm 63 extends forwardly as at 76 thereby providing a projection which is continued laterally to form a lip 77, this serving as an abutment to engage an adjustable, resilient stop member thereby to limit the movement of the arm and the temple 62 rearwardly of the loom under the influence of the preloaded elastic bushing. The lip 77 overhangs an enlarged portion 78 cast along the side of the vertical web 79 of the arm 65, this enlarged portion of the arm being counterbored for the reception of what is preferably a rubber buffer or shock absorbing stop member 80, this rubber element having a metal wear plate 81 bonded or otherwise fixed thereto so that the lip 77 engages the metalic wear plate rather than engaging directly with the rubber thereby to eliminate wear of the rubber, although it is intended that in some instances the rubber alone may be sufficient.

Adjustment is effected by an adjusting screw 82 which is threaded upwardly through the lower portion of the boss 78 to engage beneath the buffer 80, the said adjustment being maintained by suitable locking means such as the check nut 83.

Arm 63 also has integrally or otherwise formed as a part thereof a downwardly projecting flange 84 which is engaged by a leather, fibre or other contact member 85 attached at the front side of the lay 67. As the lay moves forwardly to its fullest extent for beating up the fabric, the temples must be moved toward the front of the loom throughout a short distance since they are normally positioned as near the fell of the fabric as possible. They must be displaced to provide for the beat-up function since they cannot be engaged by the reed. Forward movement of the lay results in swinging the arms 63 to the first dot-and-dash line position beyond the full line position, Fig. 4, it being understood that the bushings are preloaded as heretofore described with respect to the form of the invention first disclosed and, during loom operation, each beat-up movement of the lay results in such displacement of the temples and their arms.

The arm 63 and its attached temple may be maintained in a so-called inactive position, that is, the position generally indicated by the farthest removed dot-and-dash line showing of the arm and its extending lip flange, Fig. 4. The mid portion of the arm is so constructed as to present a latching notch 86 which is engaged by a latch 87 which forms a part of an arm 88 pivoted at 89 to the supporting arm or bracket 65 and being spring pressed or urged in a direction to assure engagement between the said latch and notch by means of a coil spring 90. The arm 88 terminates in a thumb piece 91 by which it may be pressed downwardly against the tension of spring 90 to release the latch from the notch thereby to permit return of the arm 63 and its attached temple to an active position. Movement of the latch and arm 88 under the action of spring 90 is limited by contact between two projecting lugs 92 and 93, one cast on the arm 88 and the other cast to project from the vertical web of arm 66 as shown.

Adjustment and operation of the temple mechanism of Figs. 4 and 5 are substantially the same as with the first three figures, except for the fact that here each temple is independently mounted and either one may be separately adjusted in various respects or either one may be moved to inactive position irrespectively of the other. The elastic rubber bushing is so set up and clamped in the bearing housing 74 that it is rigidly retained and the projecting shaft 64 may then be adjusted within, or the hub 75 and the arm 63 so positioned on that shaft that when the overhanging stop 77 contacts the abutment 81 of the resilient buffer, the temple 62 will assume its most rearward position and also a position in which it is at the proper place with respect to the fell of the fabric being woven. The proper amount of torsion will also be imposed upon the elastic rubber bushing, that is, approximately fifty inch pounds, or whatever value thereof is appropriate for the particular fabric being woven. The temple may then move forwardly along with a slight angular movement of arm 63 as torsion is increased in the elastic bushing, that movement depending upon the point at which the forward movement of the lay makes contact between the lip 84 and buffer 85. The movement of the temple mechanism occurs without any friction other than the molecular friction within the rubber itself and without any possibility of wear, there further being no requirement for lubrication or possibility of deterioration of the parts due to corrosion, etc. The length of the rubber bushing is perhaps greater in this form of the invention than need be the case in the first form where the shaft 12 extends clear across the loom. There, a wide resisting couple prevents any possibility of local distortion in the bushing other than that intended, namely, a torsional deflection thereof. In the form of the invention shown in Figs. 4 and 5, the length of the bushing takes care of any tendency for distortion of the rubber which might permit a sidewise movement of the temple or lower end of arm 63. It is to be understood that the rubber employed in these bushings is of a type in which there is a relatively great resistance to distortion, especially in a direction radially of the bushing since, preferably, the rubber is compacted or compressed between the shell and the core. There is very little chance for that rubber to be distorted endwise and it is not easily distorted radially although the molecular structure thereof does permit a reasonable amount of torsional distortion of the material between one bonded surface and the other, so that the mounting provides a very stable and relatively precise movement of the parts without increasing the size thereof beyond reasonable dimensions. It is obvious that when operated at no greater speeds than those which are encountered in loom operation, the rubber is never stressed beyond its elastic limits and therefore does give a relatively long period of use in which the conditions of operation for the parts do not change appreciably over those initially existing.

That cannot be said for other temple mountings since the same are very difficult to lubricate, if lubrication may be applied at all, and since wear is of major concern. Furthermore, in the conventional temple supporting structure there is a great deal of play between the various parts all of which gives rise to the generation of a considerable amount of noise which increases as time goes on, and which, furthermore, necessitate replacements, devices for taking up wear and slack, and other undesirable practices.

The rubber employed in these rubber bushings is preferably of a type adapted to resist the action of the elements, of oil or grease, acids, etc., although it is not intended that the latter come in contact therewith. The actual rubber or rubber-like compounds which may be employed may include natural rubber, the various synthetics, e. g., GR–S, neoprene, Buna-N or butyl compounds which are well known to those in the rubber industry who manufacture such mechanical rubber goods and the details thereof need not be set forth at this time.

While in the second form of the invention, the elastic rubber bushing is mounted in the supporting arm, it is quite evident that it might be mounted as a part of the hub of the depending arm which supports the temple itself and that the supporting bracket may merely be employed to carry the end of the shaft projecting from said rubber bushing.

Again, while the temple mounting of Figs. 4 and 5 is illustrated as being disposed above the fabric line, it is entirely conceivable that a structure of this general type, possibly with certain modifications, may be mounted below the fabric line, especially in some looms where there may be available a greater space for it without interference between it and other parts.

While one embodiment of the invention and a modification thereof have been disclosed, it is to be understood that the inventive concept may be carried out in a number of ways. The invention is, therefore, not to be limited to the precise details described, but is intended to cover all variations and modifications thereof falling within the spirit of the invention and the scope of the claims.

We claim:

1. In a loom for weaving, a temple and a mounting therefor which comprises an arm to the free end of which the temple is attached, a bearing bracket fixed to said loom, a shaft extending between said bracket and the end of said arm opposite that to which the temple is attached, said shaft being fixed in one of the said members and resiliently retained for oscillation within the other, said resiliently retained end thereof being mounted in an elastic bushing restrained against relative rotation within the member and on the shaft and further being so angularly disposed as to bias the temple carrying arm in a direction contra to the motion of the fabric being woven.

2. In a loom for weaving, a temple and a mounting therefor which comprises an arm to the free end of which the temple is attached, a bearing bracket fixed to said loom, a shaft extending between said bracket and the end of said arm opposite that to which the temple is attached, said shaft being fixed within said arm and resiliently retained for oscillation within the bracket, the means for so retaining the shaft in the bracket comprising a torsion resisting resilient bushing restrained against relative rotation within the bracket and upon the shaft and so angularly positioned as to bias the temple carrying arm in a direction contra to the motion of the fabric being woven.

3. In a loom for weaving, a temple and a mounting therefor which comprises an arm to the free end of which the temple is attached, a bearing bracket fixed to said loom, a shaft extending between said bracket and the end of said arm opposite that to which the temple is attached, said shaft being fixed in one of the said members and resiliently retained for oscillation within the other, said resiliently retained end thereof being mounted in an elastic bushing restrained against relative rotation within the member and on the shaft and further being so angularly disposed as to bias the temple carrying arm in a direction contra to the motion of the fabric being woven, and stop means to limit the oscillative movement of the arm under the said biasing influence of the resilient bushing.

4. In a loom for weaving, a temple and a mounting therefor which comprises an arm to the free end of which the temple is attached, a bearing bracket fixed to said loom, a shaft extending between said bracket and the end of said arm opposite that to which the temple is attached, said shaft being fixed in one of the said members and resiliently retained for oscillation within the other, said resiliently retained end thereof being mounted in an elastic bushing restrained against relative rotation within the member and on the shaft and further being so angularly disposed as to bias the temple carrying arm in a direction contra to the motion of the fabric being woven, stop means to limit the oscillative movement of the arm under the said biasing influence of the resilient bushing, and means for releasably latching the temple and arm in an inactive position beyond the range of its normal oscillative movement.

5. In a loom for weaving, a temple and a mounting therefor which comprises an arm to the free end of which the temple is attached, a bearing bracket fixed to said loom, a shaft extending between said bracket and the end of said arm opposite that to which the temple is attached, said shaft being fixed in one of the said members and resiliently retained for oscillation within the other, said resiliently retained end thereof being mounted in an elastic bushing restrained against relative rotation within the member and on the shaft and further being so angularly disposed as to bias the temple carrying arm in a direction contra to the motion of the fabric being woven, stop means to limit the oscillative movement of the arm under the said biasing influence of the resilient bushing, and means for releasably latching the temple and arm in an inactive position beyond the range of its normal oscillative movement, said latching means being positioned beyond the range of normal oscillative motion thereby to avoid contact of the parts and noise incidental thereto.

6. In a loom for weaving, a temple and a mounting therefor which comprises an arm to the free end of which the temple is attached, a bearing bracket fixed to said loom, a shaft extending between said bracket and the end of said arm opposite that to which the temple is attached, said shaft being fixed in one of the said members and resiliently retained for oscillation within the other, said resiliently retained end thereof being mounted in an elastic bushing restrained against relative rotation within the member and on the shaft and further being so angularly disposed as to bias the temple carrying arm in a direction contra to the motion of the fabric being woven, and means for releasably latching the temple and arm in an inactive position beyond the range of its normal oscillative movement.

7. In a loom for weaving, a temple and a mounting therefor which comprises an arm to the free end of which the temple is attached, a bearing bracket fixed to said loom, a shaft extending between said bracket and the end of said arm opposite that to which the temple is attached, said shaft being fixed in one of the said members and resiliently retained for oscillation within the other, said resiliently retained end thereof being mounted in a rubber bushing restrained against rotation within the member and on the shaft by rubber to metal bonded connecting means, said rubber bushing being initially stressed to bias the temple carrying arm in a direction against the motion of the fabric being woven.

8. In a loom for weaving, a temple and a mounting therefor which comprises an arm to the free end of which the temple is attached, a bearing bracket fixed to said loom, a shaft extending between said bracket and the end of said arm opposite that to which the temple is attached, said shaft being fixed within said arm and resiliently retained for oscillation within the bracket, the means for so retaining the shaft in the bracket comprising an elastic rubber bushing bonded and clamped to be retained in an annular space between the bracket and shaft, said bushing being clamped in such relative position as to bias the arm and temple carried thereby in a direction contra to that in which the fabric being woven progresses.

9. In a loom for weaving, a temple and a mounting therefor which comprises an arm to the free end of which the temple is attached, a bearing bracket fixed to said loom, a shaft extending between said bracket and the end of said arm opposite that to which the temple is attached, said shaft being fixed within said arm and resiliently retained for oscillation within the bracket, the means for so retaining the shaft in the bracket comprising an elastic rubber bushing bonded and clamped to be retained in an annular space between the bracket and shaft, said bushing being clamped in such relative position as to bias the arm and temple carried thereby in a direction contra to that in which the fabric being woven progresses, and a rubber stop means between said arm and a relatively fixed adjacent portion of said loom by which the movement of said arm is checked as it moves under the influence of the torsion in said bushing.

10. In a loom for weaving a temple and a mounting therefor which comprises an arm to the free end of which the temple is attached, a bearing bracket fixed to said loom, a shaft extending between said bracket and the end of said arm opposite that to which the temple is attached, said shaft being fixed within said arm and resiliently retained for oscillation within the bracket, the means for so retaining the shaft in the bracket comprising an elastic rubber bushing bonded and clamped to be retained in an annular space between the bracket and shaft, said bushing being clamped in such relative position as to bias the arm and temple carried thereby in a direction contra to that in which the fabric being woven progresses, and a rubber stop means between said arm and a relatively fixed adjacent portion of said loom by which the movement of said arm is checked as it moves under the influence of the torsion in said bushing, and means for retaining said arm and temple in an inactive position beyond the range of its normal oscillative movement which comprises a latch means engageable only when said arm is swung against the resistance of the rubber bushing to a position for effecting such engagement.

11. In a loom for weaving, temples and a mounting therefor comprising a shaft extending across the loom, arms to the free end of each of which a temple is attached fixed to said shaft and bearings for the shaft for supporting it and for biasing it in a direction against the movement of the fabric being woven, said bearings comprising brackets fixed to a relatively stationary part of the loom and an elastic torsion resisting bushing between said shaft and bracket and retained against relative rotative movement with respect to both the shaft and bushing.

12. In a loom for weaving, a temple and a supporting mounting therefor which comprises arms to the free end of each of which a temple is attached, a bearing bracket adjacent each arm and shaft means extending between said brackets and arms and torsion resisting elastic bushings, one for each arm and its adjacent bracket, upon which the arms may oscillate, said elastic bushings being preloaded torsionally to bias the arms and their temples against the movement of the fabric being woven.

13. In a loom for weaving, temples and a supporting mounting therefor which comprises arms to the free end of each of which a temple is attached, a bearing bracket adjacent each arm and shaft means extending between said brackets and passing through said arms, torsion resistant bearings for said shaft and arms comprising elastic rubber bushings in said brackets bonded against relative rotation on the shaft or in the brackets, said bushings being preloaded torsionally to bias the arms and their temples against the movement of the fabric being woven.

14. In a loom for weaving, temples and a supporting mounting therefor which comprises arms to the free end of each of which a temple is attached, a bearing bracket adjacent each arm positioned below the level of a fabric being woven in said loom, shaft means extending between said brackets, below the said fabric level and passing through and being fixed within said arms, torsion resistant bearings for said shaft held within said brackets and comprising elastic rubber bushings in said brackets bonded against relative rotation on the shaft or in the brackets, said bushings being preloaded torsionally to bias the arms and their temples against the movement of the fabric being woven.

15. In a loom for weaving, temples and a supporting mounting therefor which comprises arms to the free end of each of which a temple is attached, a bearing bracket adjacent each arm positioned below the level of a fabric being woven in said loom, shaft means extending between said brackets, below the said fabric level and passing through and being fixed within said arms, torsion resistant bearings for said shaft held within said brackets and comprising elastic rubber bushings in said brackets bonded against relative rotation on the shaft or in the brackets, said bushings being preloaded torsionally to bias the arms and their temples against the movement of the fabric being woven, and means comprising a rubber buffer positioned for relative contact between an arm and a fixed part of said loom for limiting movement of at least one arm and temple against said preloaded bushing.

16. Mechanism as defined in claim 15 further characterized by latch means normally out of engagement and out of range during normal oscillatory movement of the arms and temples for releasably latching them in an inactive position.

EDWARD J. BERRY.
GEORGE T. ALLENSON.

REFERENCES CITED

The following references are of record in the file of this patent:

UNITED STATES PATENTS

| Number | Name | Date |
|---|---|---|
| 177,227 | Dutcher | May 9, 1876 |
| 408,354 | Norton | Aug. 6, 1889 |
| 456,916 | Stimpson | July 28, 1891 |
| 504,288 | Tomlinson | Aug. 29, 1893 |